Jan. 7, 1964  W. S. MORTLEY  3,117,313
RADAR SYSTEMS
Filed March 10, 1958
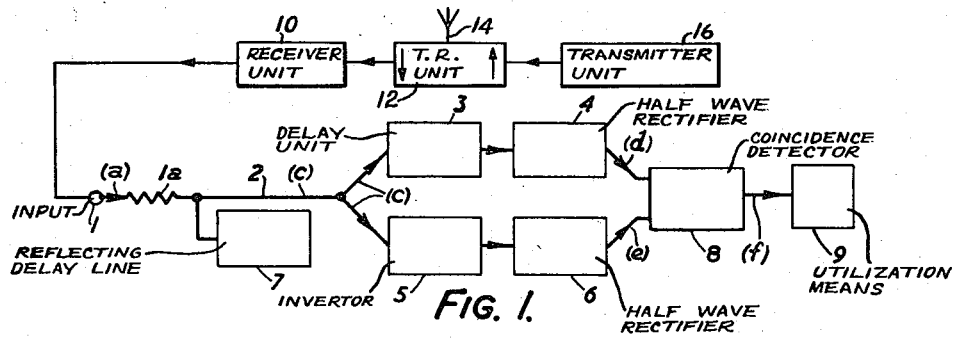
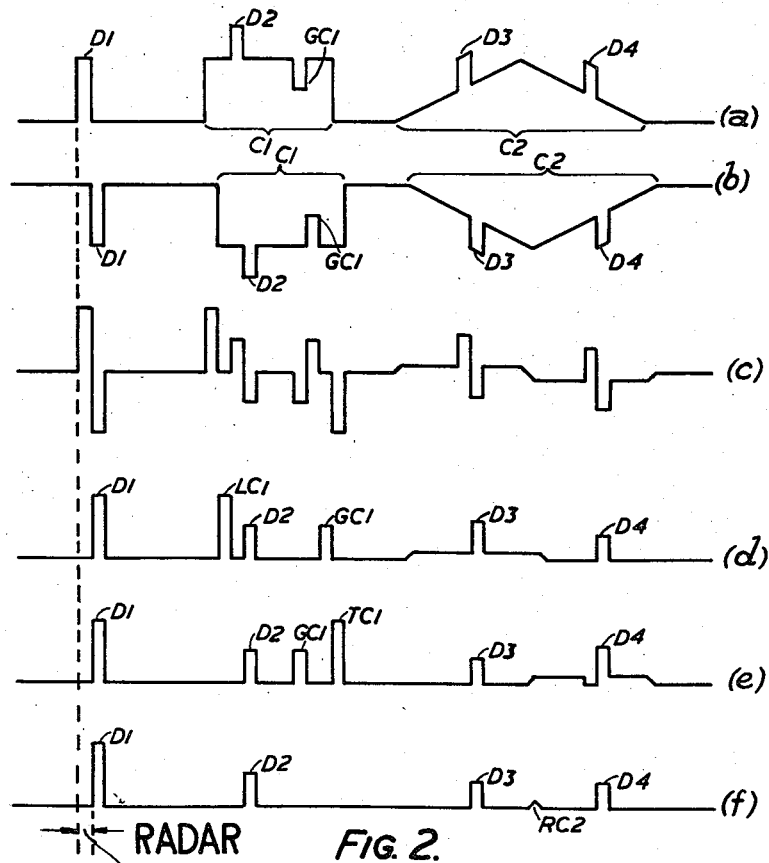
INVENTOR:
Wilfrid Sinden Mortley
BY:
Baldwin & Wight
ATTORNEYS

United States Patent Office 3,117,313
Patented Jan. 7, 1964

3,117,313
RADAR SYSTEMS
Wilfrid Sinden Mortley, Essex, England, assignor to The Marconi Company Limited, a company of Great Britain
Filed Mar. 10, 1958, Ser. No. 720,412
Claims priority, application Great Britain Apr. 4, 1957
6 Claims. (Cl. 343—5)

This invention relates to radar systems and has for its object to provide improved and relatively simple radar systems which will effectively distinguish desired targets, such as aircraft, from targets, such as turbulent rain storms, of the sort which are generally referred to by the word "clutter."

It is, of course, often desired to distinguish and display desired radar targets without their being masked by clutter and the now well known moving target indicator (M.T.I.) radar systems are commonly used for this purpose. In these systems desired targets, such as aircraft, are separated from clutter targets, such as rain storms, by taking advantage of the fact that, in general, the speed of movement of the desired targets is so greatly different from the usually much lower speeds of movement of clutter targets that separation may be effected by displaying only those targets whose speed of movement is within a predetermined range of speeds. Such M.T.I. radar systems use Doppler effect for separation of targets by speed, but in practice the velocities and directions of movement of some forms of clutter, notably turbulent rain storms, vary so much from time to time and from place to place that it is sometimes impossible to insert the correct Doppler frequency compensation to eliminate clutter targets and, even when it is possible to do this, it often takes so much time to discover what the correct Doppler frequency compensation is, as to make such radar systems far from satisfactory.

The present invention seeks to provide improved radar systems in which masking by clutter will be very much reduced but which do not possess the above mentioned defects of known M.T.I. radar systems. As will be seen later the invention takes advantage of the fact that, in general, desired targets such as aircraft are very small in comparison with cutter targets such as rain storms and very small in comparison with the distance travelled in space by radio waves during the transmission of a normal radar pulse. Thus, for example, to quote a practical figure, a transmitted pulse of 5/μsecs. duration will have a spatial existence of substantially 1500 metres. Accordingly, in general, radar pulses reflected by a target such as an aircraft will have at least approximately the same duration as the transmitted pulses, whereas reflections from rain storms and similar clutter targets will persist much longer. Incidentally it may be remarked that signals reflected from rain storms are sometimes discontinuous because sometimes reflected signals resulting from one half of a transmitted pulse will be received back at the station in phase opposition to reflected signals due to the other half thus producing in the received signal a narrow gap which may be likened to a negative signal. The present invention takes advantage of these differences between reflections from an aircraft or similar targets from reflections from a storm or similar target.

According to this invention a pulsed radar system comprises means for deriving from received video signals a signal wave form approximating to that which would be obtained by differentiating said received video signals, means for applying the derived wave form to two channels, one adapted to invert and rectify input signals fed thereto, and the other adapted to delay and rectify input signals fed thereto, the delay being at least approximately equal to the transmitted radar pulse length, a coincidence detector connected to receive as its two inputs the rectified outputs from the said two channels to produce an output only on the coincidence of input pulses of a predetermined polarity, and means for utilizing the output from the coincidence detector.

Preferably the receiver proper i.e. (the apparatus which is as known per se) for obtaining the video signals from which the derived wave form is produced is designed and dimensioned in accordance with known principles to have a logarithmic rather than a linear input-output amplitude characteristic. This has the advantage that a wider range of amplitudes may be admitted without loosing (due to limiting action) wanted targets in clutter.

The derived wave form can be obtained by actually differentiating the received video signals, but preferably the means for deriving the said wave form comprise means for inverting the received video signals and delaying them by a time substantially equal to the transmitted radar pulse length and means for additively combining the said received video signals with the inverted delayed video signals. A wave form derived in this way will obviously be a little different from one derived by actual differentiation, but this method of derivation is preferred because of the fact, which will be obvious later, that it leads to more effective elimination of clutter targets than would be the case if differentiation were employed.

Preferably the received video signals are inverted and delayed and the resultant inverted delayed video signals are additively combined with said received video signals by means of a reflecting delay line having an overall delay time (go and return) at least approximately equal to the transmitted radar pulse length and which is branched off a signal path through which said received signals are fed to the aforesaid two channels.

The coincidence detector may be of any kind known per se, e.g. a multi-grid gating valve, such as a short suppressor grid base pentode, having two input grids one of which is fed from one of the aforesaid two channels and the other of which is fed from the other, said valve being so biassed and operated as to provide an output from its anode only in response to signals coincidentally applied to both its input grids.

In a preferred embodiment of the invention a radar station includes a source of received video signals; two channels, one including a delay unit providing a delay at least approximately equal to the transmitted radar pulse length followed by a half-wave rectifier and the other including a signal inverter followed by a half-wave rectifier; a signal path leading from said source to the input ends of both said channels; a delay line short-circuited at one end so as to be reflecting at that end and providing an overall delay (go and return) at least approximately equal to said radar pulse length said delay line having its other end connected to said signal path; a coincidence detector having one input fed with the rectified output from one channel and the other input fed with the rectified output from the other channel; and means for utilizing output signals from said coincidence detector.

The invention is illustrated in and further explained in connection with the accompanying drawings in which FIG. 1 is a block diagram of a preferred embodiment of the invention showing a radar station only so far as is necessary to an understanding of the present invention, and FIG. 2 is a series of explanatory wave forms typifying wave forms which occur in various parts of the circuit of FIG. 1.

Referring to the drawings, video input signals including echoes from desired targets, echoes from clutter targets and the inevitable accompanying noise are derived in any manner known per se in pulsed radar practice by a known receiver 10 which preferably is one having a logarithmic input-output amplitude characteristic. Receiver 10 is connected to a T.R. unit 12 which is coupled to the conventional antenna 14. A transmitter unit 16 is coupled to T.R. unit 12 in a conventional manner. Video signals from receiver 10 are applied at terminal 1 and fed through a resistance 1a over a path 2 to the input sides of two channels, one of which consists of a delay unit 3 followed by a half-wave rectifier 4 and the other of which consists of an inverter 5 followed by a half-wave rectifier 6. The top line (a) of FIG. 2 typifies, in idealized manner, the sort of wave form to be expected at terminal 1. In this line, as in the other parts of FIG. 2, the signals are plotted against time (abcissae). The wave form of FIG. 2(a) shows desired target echoes at D1, D2, D3 and D4, each of which has a time duration presumed to be equal to the transmitted pulse length. It will be understood that these desired target echoes came from targets, such as aircraft, of relatively small size. It will be observed that the echoes D2, D3 and D4 are shown as occurring inside much longer clutter echoes. Two such clutter echoes are shown, one occurring over the period C1 and the other over the period C2. The shapes of clutter echoes will, of course, vary very widely in practice, but C1 is shown as roughly rectangular and C2 as roughly triangular. It will be noted that their durations are both much longer than the durations of the desired target echoes D1, D2, D3, and D4. The clutter echo C1 is shown as containing a gap GC1 equivalent to a negative signal and occurring in some manner as that already described herein.

Branched from the path 2 is a reflecting delay line 7 constituted by a known delay line short-circuited at one end and having its other connected to the said path 2. The resistance 1a is made equal to the characteristic impedance of the delay line 7. The end-to-end electrical length of the delay unit 7 is one half the length of the transmitted radar pulse so that the delay which it will impose upon a signal which enters it, is reflected from the far end, and re-emerges at the path 2 will be equal to the radar pulse length. The emergent signals from the delay unit 7 will also, of course, be inverted. Line (b) of FIG. 2 shows the signal wave form which will emerge from the delay unit 7 as the result of the application thereto of the wave form shown in line (a).

The delayed inverted signals from the delay unit 7 are added to the input signals from the terminal 1 so that the inputs to the two channels which commence respectively with the delay unit 3 and the inverter 5 will be as shown in line (c) of FIG. 2, line (c) being the summation of the signals in lines (a) and (b). The sum of the signals in line (a) and (b) may be considered to be the differential of the signals in line (a), and the means whereby line (c) is provided may be regarded as means for differentiating received video signals. These signals, after passing through the channel consisting of the units 3 and 4, will appear at the output of the rectifier 4 as shown in line (d) of FIG. 2 while the signals appearing at the output of rectifier 6 in the other channel will be as shown in line (e) of FIG. 2.

The outputs from the two channels are fed to the two input terminals of any known form of coincidence detector 8, e.g. a short suppressor grid base pentode having the two signals (from unit 4 and unit 6) applied to its control and suppressor grids and so biassed that it produces an anode output only in response to coincidentally applied signals to both these grids. The resultant output from coincidence detector 8 will therefore be as shown in line (f) of FIG. 2 and this resultant is applied to any convenient suitable known utilization circuits and display apparatus as represented in FIG. 1 merely by the rectangle 9.

It will be noted from a comparison of lines (a) and (f) of FIG. 2 that the desired target echoes D1, D2, D3 and D4 appear in line (f) clear of clutter notwithstanding that echoes D2, D3 and D4 occur in clutter, e.g. they may be echoes from aircraft in rain-storms, and that all that remains of the clutter is the small residual signal at RC2 in line (f) of FIG. 2. In lines (c) and (d) of FIG. 2 the pulses LC1 are due to the leading edge of the clutter signal C1 and in lines (c) and (e) of said FIG. 2 the pulses TC1 are due to the trailing edge of the clutter signal C1. It will be noted that the desired target echoes D1, D2, D3 and D4 in line (f) of FIG. 2 are delayed by a period equal to the transmitted radar pulse length, but this is not of practical importance. For better clarity the letters (a) to (f) identifying the different lines of FIG. 2 are also applied to FIG. 1 at points in the circuit where the signals in question appear.

I claim:

1. A pulse radar system comprising receiving means, delay means coupled to said receiving means for deriving signals from received video signals, two signal channels, fed with said derived signals, derived signal delay means in one of said channels and inverting means in the other of said channels for delaying and inverting, relative to one another, the signals passing through the said channels, the relative delay of said derived signal delay means being substantially equal to the transmitted radar pulse length, a coincidence detector connected to receive as its two inputs the outputs from said channels, and adapted to produce an output only on the coincidence of input pulses of a predetermined polarity, and means for utilizing the output from the coincidence detector.

2. A system as claimed in claim 1 wherein each of the two channels also includes a rectifier.

3. A system as claimed in claim 1 wherein the delay means coupled to said receiving means comprise means for inverting the received video signals and delaying them by a time substantially equal to the transmitted radar pulse length and means for additively combining the said received video signals with the inverted delayed video signals.

4. A pulse radar system as claimed in claim 1 wherein said receiving means has a substantially logarithmic input-output amplitude characteristic, the output of said receiving means being connected to the input of said first mentioned delay means.

5. A system as claimed in claim 1, wherein the first mentioned delay means comprises a reflecting delay line having an overall delay time substantially equal to the transmitted radar pulse length, which delay line is connected to a signal path through which the received signals are fed to said two channels.

6. A radar station including a source of received video signals; two channels, one including a delay unit providing a delay substantially equal to the transmitted radar pulse length followed by a half-wave rectifier and the other including a signal inverter followed by half-wave rectifier; a signal path leading from said source to the input ends of both said channels; a delay line short-circuited at one end so as to be reflecting at that end and providing an overall delay (go and return) approximately equal to said radar pulse length said delay line having its other end connected to said signal path; a coincidence detector having one input fed with the rectified output from one channel and the other input fed with the rectified output from the other channel; and means for utilizing output signals from said coincidence detector.

References Cited in the file of this patent

UNITED STATES PATENTS

| | | |
|---|---|---|
| 2,425,066 | Labin et al. | Aug. 5, 1947 |
| 2,523,283 | Dickson | Sept. 26, 1950 |
| 2,580,148 | Wirkler | Dec. 25, 1951 |
| 2,677,760 | Bess | May 4, 1954 |
| 2,732,492 | Sunstein | Jan. 24, 1956 |